(12) United States Patent
Fleszar et al.

(10) Patent No.: US 8,985,095 B2
(45) Date of Patent: Mar. 24, 2015

(54) ROOF-MOUNTED WATER HEATER

(75) Inventors: Andrew M. Fleszar, Monroe, MI (US); Martin D. Bracamonte, Pinehurst, NC (US); Jeffrey Jones, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 195 days.

(21) Appl. No.: 13/067,216

(22) Filed: May 17, 2011

(65) Prior Publication Data

US 2012/0291769 A1 Nov. 22, 2012

(51) Int. Cl.
*F24J 2/46* (2006.01)
*F24J 2/04* (2006.01)
*F24J 2/50* (2006.01)

(52) U.S. Cl.
CPC *F24J 2/045* (2013.01); *F24J 2/507* (2013.01); *F24J 2/0444* (2013.01); *Y02B 10/22* (2013.01); *Y02E 10/44* (2013.01); *Y02B 10/20* (2013.01)
USPC ............................................. 126/623

(58) Field of Classification Search
CPC .......... Y02B 10/20; F24J 2/045; F24J 2/0455
USPC ............................................. 126/623
See application file for complete search history.

(56) References Cited

U.S. PATENT DOCUMENTS

| | | | |
|---|---|---|---|
| 3,390,672 A * | 7/1968 | Snelling | 126/636 |
| 4,846,151 A | 7/1989 | Simko, Jr. | |
| 5,988,516 A | 11/1999 | Gilmour | |
| 6,372,312 B1 | 4/2002 | Aggas | |
| 6,420,002 B1 | 7/2002 | Aggas et al. | |
| 6,444,281 B1 | 9/2002 | Wang et al. | |
| 6,541,083 B1 | 4/2003 | Landa et al. | |
| 6,641,689 B1 | 11/2003 | Aggas | |
| 6,647,979 B2 | 11/2003 | Snyder | |
| 6,679,247 B1 | 1/2004 | Gozikowski | |
| 6,692,600 B2 | 2/2004 | Veerasamy et al. | |
| 6,701,749 B2 | 3/2004 | Wang et al. | |
| 6,763,826 B1 | 7/2004 | Gumm et al. | |
| 6,946,171 B1 | 9/2005 | Aggas | |
| 6,967,060 B2 | 11/2005 | Stachowiak | |
| 7,056,588 B2 | 6/2006 | Neuman et al. | |
| 7,314,668 B2 | 1/2008 | Lingle et al. | |
| 7,708,010 B2 | 5/2010 | Sweet | |
| 7,793,652 B1 | 9/2010 | Delgado | |

(Continued)

FOREIGN PATENT DOCUMENTS

| | | |
|---|---|---|
| DE | 31 01 298 A1 | 9/1982 |
| DE | 10 2008 045 324 A1 | 4/2010 |
| WO | WO 87/03327 | 6/1987 |

OTHER PUBLICATIONS

International Search Report mailed May 8, 2013.

*Primary Examiner* — Kenneth Rinehart
*Assistant Examiner* — Gajanan M Prabhu
(74) *Attorney, Agent, or Firm* — Nixon & Vanderhye P.C.

(57) ABSTRACT

Certain example embodiments of this invention relate to water heaters adapted to be mounted on or proximate the roof of a structure such as a building (e.g., residential home, commercial building, etc.). The liquid to be heated can be water, or other liquid, in different example embodiments. In certain example embodiments, at least one vacuum insulated glass (VIG) unit is provided as part of the water heater structure in order to help preserve heat that has been absorbed and/or generated.

11 Claims, 2 Drawing Sheets

(56) References Cited

U.S. PATENT DOCUMENTS

| | | |
|---|---|---|
| 7,845,142 B2 | 12/2010 | Theios |
| 7,851,034 B2 | 12/2010 | Cooper |
| 7,897,260 B2 | 3/2011 | Nunez-Regueiro et al. |
| 7,919,157 B2 | 4/2011 | Cooper |
| 7,980,031 B2 * | 7/2011 | O'Hagin .......................... 52/200 |
| 8,557,391 B2 * | 10/2013 | Frank et al. .................... 428/434 |
| 2007/0235021 A1 * | 10/2007 | Reed et al. ..................... 126/621 |
| 2008/0149095 A1 * | 6/2008 | Asen .............................. 126/652 |
| 2009/0151854 A1 | 6/2009 | Cooper |
| 2011/0253126 A1 * | 10/2011 | Yin et al. ....................... 126/622 |
| 2011/0296771 A1 * | 12/2011 | Miller et al. .................. 52/171.3 |

\* cited by examiner

ROOF-MOUNTED WATER HEATER

FIELD OF THE INVENTION

Certain example embodiments of this invention relate to water heaters adapted to be mounted on or proximate the roof or outside wall of a structure such as a building (e.g., residential home, commercial building, etc.). The liquid to be heated can be water or other liquid in different example embodiments of this invention. In certain example embodiments, at least one vacuum insulated glass (VIG) unit is provided as part of the water heater structure in order to help preserve heat that has been absorbed and/or generated.

BACKGROUND AND SUMMARY OF EXAMPLE EMBODIMENTS OF THE INVENTION

Roof mounted water heaters are known in the art. Unfortunately, conventional roof mounted water heaters suffer from a problem of allowing heat that has been absorbed to escape, thereby decreasing the efficiency of the water heating system. In view of the above, it would be desirable to improve the efficiency of roof mounted water heater systems.

In certain example embodiments of this invention, there is provided a hot liquid heater system at an area of a roof or outside wall of a building, the hot liquid heater system comprising: a heating chamber in which liquid is heated by solar energy from the sun, the heating chamber located proximate the roof or outside wall of the building; a first vacuum insulating glass (VIG) unit located above the heating chamber so that the solar energy passes through the first VIG unit before reaching the heating chamber; and wherein the first VIG unit comprises first and second substantially parallel flat spaced apart glass substrates defining a gap therebetween, an edge seal provided around a periphery of the first and second glass substrate to form an hermetic seal, and a plurality of spacers provided between at least the first and second substrates, and wherein the gap between the first and second substrates is at pressure less than atmospheric pressure.

The liquid to be heated may be water in certain example embodiments.

In certain example embodiments, the heating chamber may comprise at least one copper tube through which liquid to be heated flows.

In certain example embodiments, the hot liquid heater system may further comprise a second VIG unit located under the heating chamber. In certain example embodiments, the first VIG unit does not include a low-E coating, and the second VIG unit does comprise a low-E coating.

In certain example embodiments of this invention, there is provided a hot water heater system to be mounted at an area of a roof or outside wall of a building, the hot water heater system comprising: a tube through which water to be heated by solar energy from the sun flows, the tube to be located proximate the roof or wall of the building; a vacuum insulating glass (VIG) unit located above the tube so that the solar energy passes through the VIG unit before reaching the tube; and wherein the VIG unit comprises first and second substantially parallel flat spaced apart glass substrates with a gap therebetween, an edge seal provided around a periphery of the first and second glass substrates to form an hermetic seal, and a plurality of spacers provided between at least the first and second substrates, and wherein the gap between the first and second substrates is at pressure less than atmospheric pressure.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
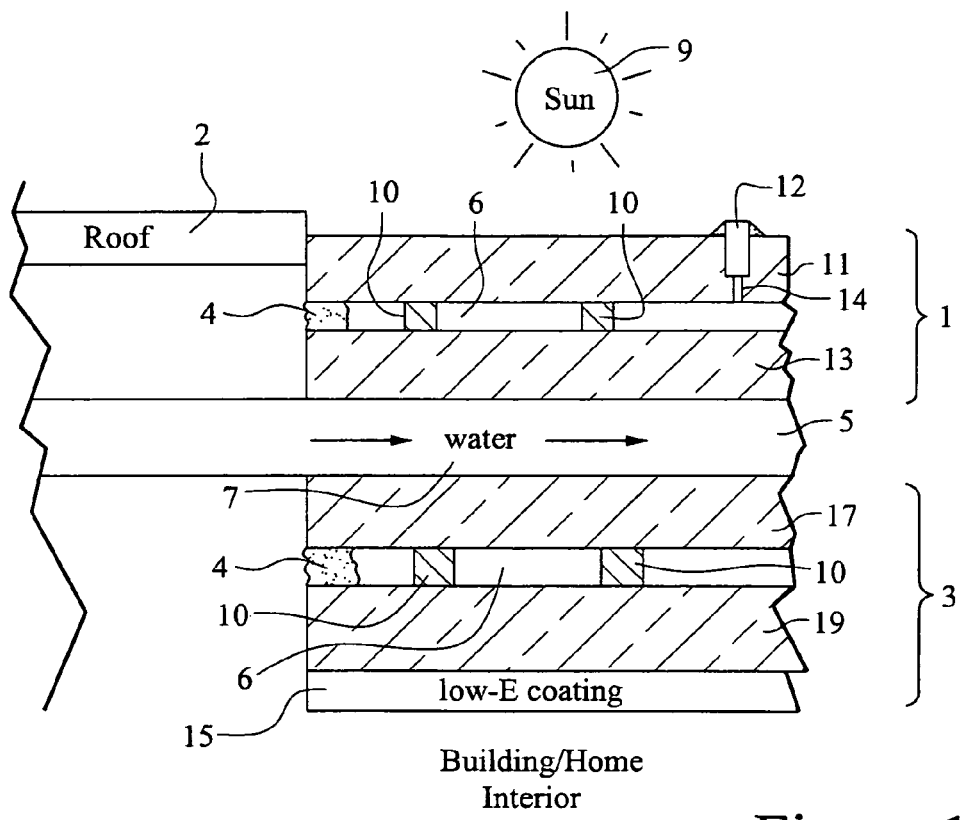
FIG. 1 is a cross-sectional view of a roof or outside wall mounted water heater structure according to an example embodiment of this invention.

Like reference numerals are used to refer to like parts throughout the several views.

Roof mounted water heaters can take many different forms. For example, some roof mounted water heaters comprise pipe(s) (e.g., copper pipe(s)), hose(s), or the like containing liquid to be heated (water or other liquid) located on or at the roof (or alternatively on or at an outside vertical wall) of a building (e.g., home, commercial building, greenhouse, office building, etc.). The liquid in the pipe(s), hose, or the like is heated by energy from the sun and thereafter is caused to flow back into or through the building toward a storage structure such as a water heater where the heat absorbed from the sun proximate the roof can be transferred into the bulk storage of the water in the building. In certain embodiments it is the water itself which is heated at the roof of the building and then pumped back into a storage container in the basement or in some other area of the building in order to cause hot water to be stored. In other example embodiments, a liquid other than water can be heated at the roof of the building and then pumped back to an area where its absorbed heat can be exchanged into water of a water heating system of the building. For example and without limitation, further example water heaters that can be used as roof mounted water heaters herein may be found in U.S. Pat. Nos. 6,679,247, 6,647,979, 6,763,826, and 7,708,010, the disclosures of which are all hereby incorporated herein by reference.

In certain example embodiments, at least one vacuum insulated glass (VIG) unit is provided as part of the water heater structure in order to help preserve heat that has been absorbed and/or generated. Different types of VIG unit can be used in different example embodiments of this invention. For example and without limitation, the VIG units disclosed in one or more of the following U.S. Patents can be used for one or multiple VIG units according to certain example embodiments of this invention, all of the following U.S. Patents hereby being incorporated herein by reference: U.S. Pat. Nos. 6,692,600, 7,919,157, 6,372,312, 7,851,034, 7,845,142, 6,946,171, 6,701,749, 6,444,281, 6,641,689, 6,541,083, and 6,420,002. Thus, the VIG units of any of these patents (all incorporated herein by reference in their entireties) can be used for any VIG unit discussed herein according to different example embodiments of this invention. In the various embodiments discussed herein, the VIG unit(s) substantially preserve heat that has been absorbed and/or generated, thereby resulting in improved efficiency and superior insulating capability.

In certain example embodiments of this invention, a VIG unit can be used to replace the top glass lite of a traditional copper pipe-based roof mounted solar hot water heater. In this configuration, the VIG with its superior insulation ability protects/preserves heat that is generated around the copper tubes and allows more heat to be absorbed and/or kept by the pipes.

In other example embodiments of this invention, a VIG unit can be attached to another back panel providing a space therebetween where water (or other liquid to be heated) can be circulated and heated by solar energy. In this configuration, the superior insulating capability of the VIG unit protects any heat absorbed, and by filling substantially the entire cavity between the VIG and the back panel with the liquid to be heated more surface area of the liquid can absorb more solar heat to provide improved efficiency in this respect as well. In certain example embodiments, the "another back panel" of such embodiments can be a VIG unit (e.g., see FIGS. 1 and 3), or some other structure such as a glass sheet, metal sheet, refractory, or the like.

In certain example embodiments of this invention, two VIG units can be provided with a heating space therebetween. Liquid (e.g., water) to be heated is circulated in the space between the VIG units, and the liquid is heated by solar energy such as from the sun. The VIG panels with their insulating capability protect and/or substantially preserve heat that is absorbed by the liquid and keep much of it from escaping. The top VIG unit (i.e., the VIG unit closest to the sun) can be configured with substantially clear and transparent glass sheets and with no low-E coating so as to allow very much visible and IR radiation from the sun to pass therethrough and heat the liquid. On the other hand, the rear VIG unit (i.e., the VIG unit furthest from the sun) can include at least one low-E (low emissivity) coating on at least one of its glass substrates in order to block IR radiation. The low-E coating on the rear VIG unit is advantageous in that it can keep IR radiation from undesirably heating the interior of the building (e.g., in skylight applications), and can also advantageously reflect IR back toward the liquid to be heated in order to provide additional energy for heating the liquid. In such example embodiments, the water heater can function both as a water heater and as a skylight in certain example instances, e.g., for residential homes in generating domestic hot water that can be used in a home's hot water heater/system.

Figure 3:
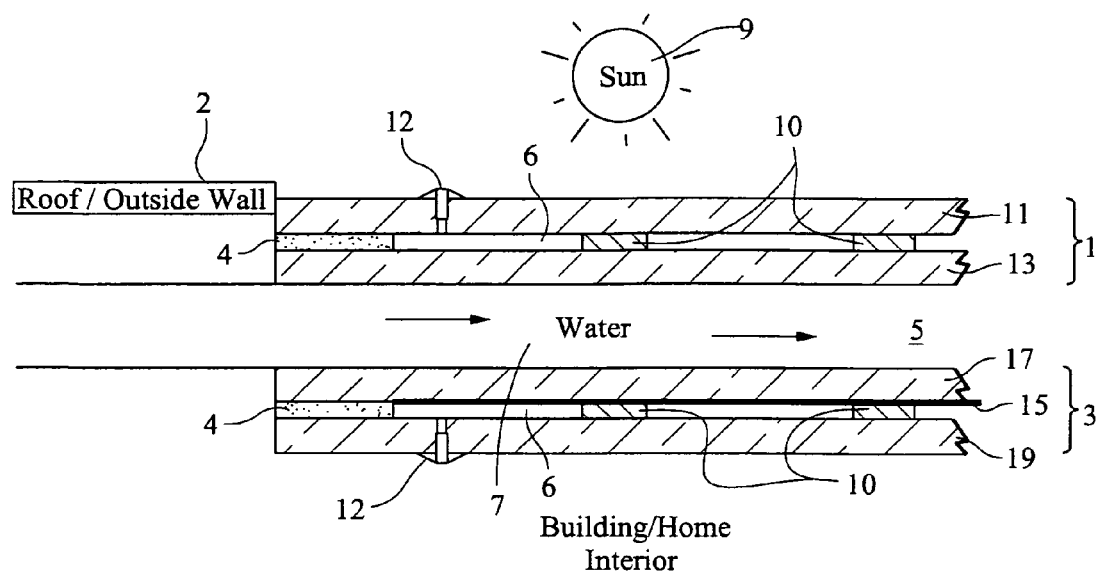
FIG. 3 is a cross-sectional view of a roof or outside wall mounted water heater structure according to another example embodiment of this invention.

FIGS. 1 and 3 are cross sectional views of example embodiments of this invention, where two VIG units 1 and 3 are provided with a heating space (or heating chamber) 5 therebetween. Liquid (e.g., water) 7 to be heated is circulated in the space/chamber 5 between the VIG units 1 and 3, and the liquid 7 is heated by solar energy such as from the sun 9. The VIG panels 1 and 3 with their insulating capability protect and/or substantially preserve heat that is absorbed by the liquid 7 and keep much of it from escaping. The top VIG unit (i.e., the VIG unit closest to the sun) 1 can be configured with substantially clear and transparent glass sheets 11, 13 and with no low-E coating so as to allow much visible and IR radiation from the sun (e.g., at least about 50%, more preferably at least about 60, and most preferably at least about 70%) to pass therethrough and heat the liquid 7. On the other hand, the rear VIG unit (i.e., the VIG unit furthest from the sun) 3 can include at least one low-E (low emissivity) coating 15 on at least one of its glass substrates (17 and/or 19) in order to block IR radiation. A "low-E coating" is a coating that has at least one IR reflecting layer (e.g., a layer of or based on an IR reflecting material such as Ag, Au, Ni, NiCr, Nb and/or NbZr) sandwiched between at least two dielectric layers (e.g., layers such as zinc oxide, zinc stannage, silicon nitride, titanium oxide, tin oxide, etc.). Different example low-E coatings 15 that may be used as example low-E coating 15 are described and illustrated in the following U.S. Patents all of which are hereby incorporated herein by reference: U.S. Pat. Nos. 7,897,260, 7,879,448, 7,820,019, 7,771,830, 7,771,571, 7,655,313, 7,648,769, 7,645,487, 7,597,965, 7,314,668, 7,056,588 and 6,967,060. One or more such low-E coatings 15 may be provided as part of the rear VIG unit 3 in different example embodiments of this invention. For example, as shown in FIG. 3, the low-E coating 15 is preferably provided on the surface of glass substrate 17 furthest from the sun 9, so that the low-E coating is adjacent the spacers 10. In other example embodiments, a low-E coating 15 may be provided in different locations such as shown in FIG. 1. In different example embodiments, that low-E coating 15 may be located on the surface of glass substrate 19 closest to the sun, or on either surface of glass substrate 17. In certain example embodiments, different low-E coatings may be supported by both of substrates 17 and 19. The low-E coating(s) 15 on the rear VIG unit 3 is advantageous in that it can keep IR radiation from undesirably heating the interior of the building (e.g., in skylight applications), and can also advantageously reflect IR back toward the liquid 7 to be heated in order to provide additional energy for heating the liquid. In such example embodiments, the water heater can function both as a water heater and as a skylight in certain example instances, e.g., for residential homes in generating domestic hot water that can be used in a home's hot water heater/system. In certain example embodiments of this invention, one or both VIG units can be a vacuum insulated panel (VIP).

VIG unit 1 in the FIG. 1 and FIG. 3 embodiments includes first and second substantially flat spaced apart transparent glass substrates 11 and 13 (tempered or non-tempered), and an evacuated or low pressure space 6 between the glass substrates 11, 13. Glass sheets/substrates 11 and 13 are interconnected by peripheral or edge seal of fused solder glass or the like 4 and an array of support pillars or spacers 10. The spacers 10 can be of any suitable material, including but not limited to glass, steel, ceramic, sapphire, polymer, or the like, and may be of any suitable shape such as spheres, discs, ovals, or the like. Pump out tube 12 (e.g., made of glass) is hermetically sealed by solder glass or the like to an aperture or hole 14 in the glass sheet 11. The edge seal 4 may comprise metal in certain example and/or alternative embodiments. A vacuum is attached to pump out tube 12 during the manufacturing process of the VIG unit so that the interior cavity 6 between substrates 11 and 13 can be evacuated to create a low pressure area or space 6. The pressure in space 6 is less than atmospheric pressure. After evacuation, tube 12 is melted to seal the vacuum. Optionally, a getter (not shown) may be included within each VIG unit. Similarly, VIG unit 3 includes first and second substantially flat spaced apart glass substrates 17 and 19 (tempered or non-tempered) and an evacuated or low pressure space 6 between the glass substrates. Glass sheets/substrates 17 and 19 are likewise interconnected by peripheral or edge seal of fused solder glass or the like 4 and an array of support pillars or spacers 10. A similar pump-out tube 12 may also be provided as part of VIG unit 3 in certain example embodiments, e.g., as shown in FIG. 3.

Spacers 10, arranged in an array between the substrates, maintain low pressure space 16 between the glass substrates in each VIG unit. Spacers or pillars 10 are provided between the glass substrates of each VIG unit order to maintain separation of the two approximately parallel glass sheets against atmospheric pressure. In certain example embodiments, all spacers 10 in a VIG unit are of approximately the same size and/or material. In certain embodiments of this invention, spacers 10 have a maximum thickness or height of from about 10 to 100 μm. Spacers 10 may be shaped as spheres, cylinders, ovals, rectangles, squares, or any other suitable shape in different embodiments of this invention. In certain preferred embodiments, glass substrates 11, 13, 17 and/or 19 are soda-lime-silica float glass. Hermetic peripheral or edge seal 4, provided between the glass substrates in each VIG unit, seals off the low pressure space 6 from surrounding atmospheric pressure. The peripheral/edge seal 4 (one or multiple piece edge seals may be used in different embodiments) may be located entirely between the opposing substrates of a VIG unit. However, the peripheral/edge seal 4 may instead be located partially between the glass substrates in certain example embodiments. Moreover, the opposing substrates (e.g., 11 and 13) of a VIG unit herein may be of approximately the same size, or alternatively may be of different sizes in different example embodiments of this invention. In certain embodiments of this invention, peripheral or edge seal 4 may be made of or include solder glass, indium, an alkali silicate (e.g. sodium silicate, potassium silicate, etc.), or any other suitable material in different embodiments of this invention. In certain embodiments, an additional edge seal(s) (i.e. one or more additional seals; not shown) may be provided so that the edge seal 4 may be, for example, a two or three seal system. The evacuation of space 6 eliminates or reduces heat transport between glass substrates of a VIG unit due to gaseous conduction and convection. High levels of thermal insulation can thus be achieved. Low gaseous thermal conduction may be achieved when the pressure in space 6 in one or both VIG units is reduced to a level e.g., equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic edge sealing system 4, including one or more edge seals, substantially eliminates any ingress or outgress of gas or air to/from low pressure space 6.

Example VIG units 1 and 3, with their example fused solder glass inclusive peripheral seals 4, have been manufactured as follows in certain example instances. Glass frit in a solution (ultimately to form solder glass edge seal 4) is initially deposited around the periphery of substrate 13 (or 19). The other substrate 11 (or 17) is brought down over top of substrate 13 (or 19) so as to sandwich spacers 10 and the glass frit/solution therebetween. The entire assembly including the glass substrates, the spacers 10, and the seal material is then heated to a temperature of approximately 500° C., at which point the glass frit melts, wets the surfaces of the glass substrates and ultimately forms hermetic peripheral or edge seal 4. After formation of edge seal 4, a vacuum is drawn via the tube 12 to form low pressure space 6. After formation of the peripheral/edge seal 4 and pulling of the vacuum, the top of the pump out tube 12 is sealed off and the VIG unit is cooled to room temperature. Each of the VIG units herein may be made in a similar manner in example embodiments of this invention. In certain example embodiments, metal (e.g., copper strips) can be provided for at least part of the edge seal 4, and the spacers/pillars can be placed while putting the unit into a vacuum chamber; and the seal can then be sealed by laser application to the metal.

In the FIG. 1 and FIG. 3 embodiments, the heater apparatus is mounted at (e.g., on or in) the roof area of the building, and/or at/on an outside substantially vertical wall of the building. For example, FIGS. 1 and 3 illustrate that the outer surface of the roof 2 (or alternatively an outside wall of the building) may be substantially flush, or approximately flush, with the outer surface of the outer VIG unit 1. However, in other example embodiments of this invention, the outer surface of the outer VIG unit 1 may be more recesses from the outer surface of the roof or wall, or alternatively both VIG units 1, 3 may be mounted over top of the roof 2 or wall.

Figure 2:
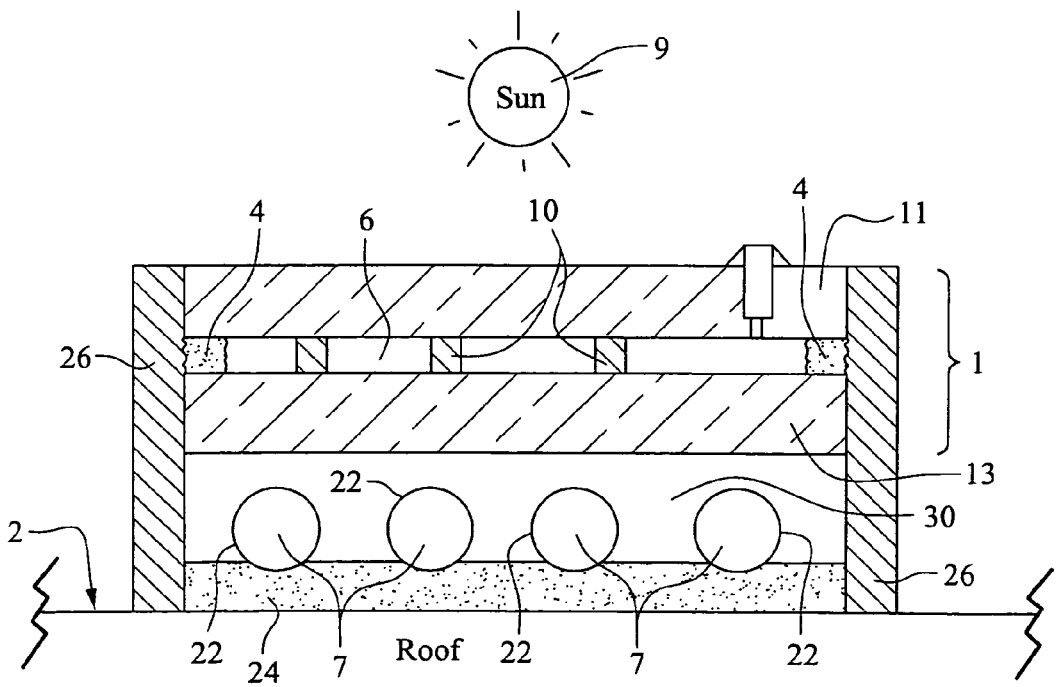
FIG. 2 is a cross-sectional view of a roof or outside wall mounted water heater structure according to another example embodiment of this invention.

FIG. 2 illustrates a liquid heater apparatus according to another example embodiment of this invention. The heater apparatus of the FIG. 2 embodiment includes VIG unit 1 which can be a top cover of the heater apparatus, a heating chamber including at least one tube(s) 22 through which the liquid 7 to be heated flows, mounting structure 24 for mounting the tubes 22 such that the structure 24 is provided at least partially between the tubes 22 and the roof 2, sidewalls 26 of the heater apparatus, and space 30. In this example embodiment, a VIG unit 1 is provided as the top or outer glass lite of a copper pipe-based roof mounted solar hot water heater (it is possible for liquid other than water to be heated in all embodiments herein). In this configuration, the VIG unit 1 with its superior insulation ability protects/preserves heat that is generated around the hollow tubes (e.g., copper tubes) 22 and allows more heat to be absorbed and/or kept by the tubes/pipes 22 and the liquid (e.g., water) flowing therethrough. As with the FIG. 1 embodiment, liquid 7 in the tubes 22 (e.g., pipe, hose, or the like) is heated by energy from the sun 9 and thereafter is caused to flow back into or through the building toward a storage structure such as a water heater or storage drum(s) where the heat absorbed from the sun proximate the roof can be transferred into the bulk storage of the water in the building. In certain examples of the FIG. 1, FIG. 2, and FIG. 3 embodiments it is the water itself which is heated at the roof of the building and then pumped back into a storage container in the basement or in some other area of the building in order to cause hot water to be stored. In other example embodiments, a liquid 7 other than water can be heated at the roof of the building and then pumped back to an area where its absorbed heat can be exchanged into water of a water heating system of the building. In certain example embodiments, it is possible to provide a second VIG unit 3 in the FIG. 2 embodiment under the heating chamber (under tube(s) 22) so that the second VIG unit 3 either replaces or supplements structure 24.

"Peripheral" and "edge" seals herein do not mean that the seals are located at the absolute periphery or edge of the VIG unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, while a component may be said to be "on" or "supported" by one or more of the substrates herein, this does not mean that the component must directly contact the substrate(s). In other words, the word "on" covers both directly and indirectly on, so that for example a component may be considered "on" a substrate even if other material (e.g., a coating and/or thin film) is provided between the substrate and the component.

It will be appreciated that the example embodiments described herein may be used in connection with a variety of different VIG assembly and/or other units or components. For example, the substrates may be glass substrates, heat strengthened substrates, tempered substrates, etc. The terms "heat treatment" and "heat treating" as used herein mean heating the article to a temperature sufficient to enabling thermal tempering, bending, and/or heat strengthening of the glass. This includes, for example, heating an article to a temperature of at least about 580 or 600 degrees C. for a sufficient period to enable tempering and/or heat strengthening, more preferably at least about 600 degrees C., and sometimes to 625 degrees C. In some instances, the HT may be for at least about 4 or 5 minutes.

It is noted that the transparent glass substrate(s) (e.g., 11, 13, 17 and/or 19) may be heat treated in certain example embodiments so that the glass substrate(s) is/are either heat strengthened or thermally tempered (e.g., at a temperature of at least about 580 degrees C., more preferably at least about 600 degrees C., and often at least about 620 or 640 degrees C.).

Certain example embodiments may provide localized heating to and/or IR heating of the frits as disclosed in, for example, application Ser. Nos. 12/000,663 and 12/000,791, the entire contents of each which are hereby incorporated herein by reference. This may be facilitated by designing the frit of certain example embodiments to absorb infrared, e.g., in the 800-2000 nm regions (or any sub-regions therein). This may be accomplished, for example, by providing additives that will absorb these wavelengths. These additives may be provided at various times including, for example, during the batch recipe of the frit and melted into the glass frit, added as powder to the base powdered frit, etc. In such cases, the frit preferably will heat up and melt while having only a small, if any, impact on the beads included in the mixture.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hot liquid heater system at an area of a roof or outside wall of a building, the hot liquid heater system comprising: a heating chamber in which liquid is heated by solar energy from the sun, the heating chamber located proximate the roof or outside wall of the building; a first vacuum insulating glass (VIG) unit located above the heating chamber so that the solar energy passes through the first VIG unit before reaching the heating chamber; wherein the first VIG unit comprises first and second substantially parallel flat spaced apart glass substrates defining a gap therebetween, an edge seal provided around a periphery of the first and second glass substrates to form an hermetic seal, and a plurality of spacers provided between at least the first and second substrates, and wherein the gap between the first and second substrates is at pressure less than atmospheric pressure; a mounting structure formed from a non-glass material, the mounting structure having a length dimension and/or a width dimension that substantially match(es) the corresponding dimension(s) of the first VIG unit, the mounting structure being in direct physical contact with an outermost surface of the roof or outside wall of the building along said length and/or width dimension(s) such that the hot liquid heater system protrudes from the roof or outside wall of the building; a pair of sidewalls defining outer edges of the hot liquid hearing system and to which the first VIG unit and the mounting structure are attached; wherein the mounting structure is provided between the roof or outside wall of the building and the heating chamber; wherein the heating chamber is at least partially defined as being between the first VIG unit, the sidewalls, and the mounting structure; a second VIG unit located under the heating chamber and over the mounting structure so that the heating chamber is located between the first and second VIG units; and wherein the second VIG unit comprises third and fourth substantially parallel flat spaced apart glass substrates with a gap therebetween, an edge seal provided around a periphery of the third and fourth glass substrates to form an hermetic seal, and a plurality of spacers provided between at least the third and fourth substrates and wherein the gap between the third and fourth substrates is at pressure less than atmospheric pressure.

2. The hot liquid heater system of claim 1, wherein the liquid flows through the heating chamber.

3. The hot liquid heater system of claim 1, wherein the liquid comprises water.

4. The hot liquid heater system of claim 1, wherein the heating chamber comprising at least one copper tube through which liquid to be heated flows.

5. The hot liquid heater system of claim 1, wherein the edge seal of the first VIG unit comprises solder glass.

6. The hot liquid heater system of claim 1, wherein the first VIG unit does not include a low-E coating.

7. The hot liquid heater system of claim 1, wherein water heated in the heating chamber is circulated to a storage tank in the building.

8. The hot liquid heater system of claim 1, wherein the first VIG does not include a low-E coating, and wherein the second VIG unit does comprise a low-E coating.

9. The hot liquid heater system of claim 1, wherein the mounting structure is provided between the roof of the building and the heating chamber.

10. The hot liquid heater system of claim 1, wherein the mounting structure is provided between the outside wall of the building and the heating chamber.

11. The hot liquid heater system of claim 1, wherein the heating chamber comprises at least one tube through which liquid to be heated flows, said tube being at least partially accommodated by a correspondingly sized and shaped channel formed in the mounting structure.

* * * * *